United States Patent [19]
Foote et al.

[11] Patent Number: 5,587,530
[45] Date of Patent: Dec. 24, 1996

[54] LOW STRESS MAGNET INTERFACE FOR A FORCE REBALANCE ACCELEROMETER

[75] Inventors: Steven A. Foote, Issaquah; Damon R. Stoddard, Seattle, both of Wash.

[73] Assignee: AlliedSignal Inc., Morristown, N.J.

[21] Appl. No.: 420,916

[22] Filed: Apr. 12, 1995

Related U.S. Application Data

[62] Division of Ser. No. 184,527, Jan. 21, 1994, Pat. No. 5,532,665.

[51] Int. Cl.$^6$ .................... G01P 15/13; G01P 15/08
[52] U.S. Cl. ................. 73/514.23; 73/514.17; 73/514.21; 73/497
[58] Field of Search ............... 83/514.23, 497, 83/514.17, 514.16, 514.36, 514.21, 514.22

[56] References Cited

U.S. PATENT DOCUMENTS

| | | | |
|---|---|---|---|
| 2,029,282 | 1/1936 | Serge. | |
| 4,182,187 | 1/1980 | Hanson | 73/514.23 |
| 4,250,757 | 2/1981 | Hanson | 73/514.23 |
| 4,394,405 | 7/1983 | Atherton | 427/58 |
| 4,399,700 | 8/1983 | Hanson | 73/514.23 |
| 4,400,979 | 8/1983 | Hanson et al. | 73/514.23 |
| 4,441,366 | 4/1984 | Hanson | 73/514.23 |
| 4,555,944 | 12/1985 | Hanson et al. | 73/514.23 |
| 4,555,945 | 12/1985 | Hanson | 73/514.23 |
| 4,592,234 | 6/1986 | Norling | 73/514.23 |
| 4,620,442 | 11/1986 | MacGugan et al. | 73/497 |
| 4,697,455 | 10/1987 | Norling | 73/514.23 |
| 4,726,228 | 2/1988 | Norling | 73/514.23 |
| 4,854,169 | 8/1989 | Sakuma et al. | 73/514.23 |
| 4,932,258 | 6/1990 | Norling | 73/514.23 |
| 4,944,184 | 7/1990 | Blake et al. | 73/514.23 |
| 5,024,089 | 6/1991 | Norling | 73/514.23 |
| 5,085,079 | 2/1992 | Holdren et al. | 73/514.23 |
| 5,090,243 | 2/1992 | Holdren et al. | 73/514.23 |
| 5,097,172 | 3/1992 | Becka | 310/348 |
| 5,111,694 | 5/1992 | Foote | 73/497 |
| 5,182,949 | 2/1993 | Rupnick et al. | 73/514.38 |
| 5,203,210 | 4/1993 | Terry et al. | 73/514.17 |
| 5,212,984 | 5/1993 | Norling et al. | 73/497 |
| 5,220,831 | 6/1993 | Lee | 73/497 |

FOREIGN PATENT DOCUMENTS 407224  3/1969  Australia ................ 73/497

Primary Examiner—Hezron E. Williams
Assistant Examiner—Helen C. Kwok

[57] ABSTRACT

A force rebalance accelerometer includes a proof mass suspended by one or more flexures between stationary mounted upper and lower excitation rings. Pick-off capacitance plates formed on opposing sides of the proof mass form capacitance elements whose capacitance varies in response to displacement of the proof mass to provide a displacement signal. The displacement signal is applied to one or more electromagnets, used to force the proof mass back to a null or at-rest position. The drive current applied to the electromagnets thus represents the force or acceleration applied to the accelerometer. The electromagnets include a magnet and a pole piece which forms a magnetic return path. In order to relieve stresses due to thermal expansion, the magnet is spaced apart from the pole piece to enable the bonding area to be constrained to a minimum which, in turn, reduces the overall stress on the accelerometer.

3 Claims, 2 Drawing Sheets

LOW STRESS MAGNET INTERFACE FOR A FORCE REBALANCE ACCELEROMETER

This application is a divisional of U.S. Ser. No. 08/184,527, filed Jan. 21, 1994, now abandoned.

BACKGROUND OF THE INVENTION

1. Field of Invention

The present invention relates to an accelerometer and, more particularly, to a stress isolation groove for reducing mechanical stress at the magnet interface of a force rebalance accelerometer which includes a proof mass suspended between one or more magnet assemblies.

2. Description of the Prior Art

Force rebalance accelerometers which include a proof mass suspended between one or more magnet assemblies are generally known in the art. Examples of such accelerometers are disclosed in U.S. Pat. Nos. 4,182,197; 4,250,757; 4,394,405; 4,399,700; 4,400,979; 4,441,366; 4,555,944; 4,555,945; 4,592,234; 4,620,442; 4,697,455; 4,726,228; 4,932,258; 4,944,184; 5,024,089; 5,085,079; 5,090,243; 5,097,172; 5,111,694; 5,182,949; 5,203,210; 5,212,984; and 5,220,831, all herein incorporated by reference. Such force rebalance accelerometers normally include a proof mass, known to be formed from amorphous quartz, suspended by one or more flexures to enable the proof mass to deflect in response to forces or accelerations along a sensitive axis, generally perpendicular to the plane of the proof mass. At rest, the proof mass is normally suspended equidistantly between upper and lower excitation rings Electrically conductive material forming pick-off capacitance plates, is disposed on opposing sides of the proof mass to form capacitive elements with the excitation rings. An acceleration or force applied along the sensitive axis causes the proof mass to deflect either upwardly or downwardly which causes the distance between the pick-off capacitance plates and the upper and lower excitation rings to vary. This change in the distance between the pick-off capacitance plates and the upper and lower excitation rings causes a change in the capacitance of the capacitive elements. The difference in the capacitances of the capacitive elements is thus representative of the displacement of the proof mass along the sensitive axis. This displacement signal is applied to a servo system that includes one or more electromagnets which function to return the proof mass to its null or at-rest position. The magnitude of the drive currents applied to the electromagnets, in turn, is representative of the acceleration or force along the sensitive axis.

The electromagnets are known to include a magnet formed from, for example, alnico, normally bonded to an excitation ring formed from a material having relatively high permeability, such as Invar, to form a magnetic return path. The materials used for the magnet and the excitation ring will have different coefficients of thermal expansion, since the materials are different. As such, the interface defined between the magnet and the excitation ring will be subject to stress as a function of temperature. Such stress over a period of time and/or temperature degrades the performance of the accelerometer.

In order to resolve this problem, compliant epoxies have been used to bond the magnet to the excitation ring. However, such compliant epoxies degrade the long term stability of the accelerometer.

SUMMARY OF THE INVENTION

It is an object of the present invention to solve various problems associated with the prior art.

It is yet another object of the present invention to provide a force rebalance accelerometer which minimizes stress of the accelerometer due to temperature expansion without the use of a compliant epoxy.

It is yet another object of the present invention to provide a force rebalance accelerometer which provides relatively stable output over temperature and over a relatively long period of time.

Briefly, the present invention relates to a force rebalance accelerometer which includes a proof mass suspended by one or more flexures between stationary mounted upper and lower excitation rings. Pick-off capacitance plates formed on opposing sides of the proof mass are used to form capacitance elements whose capacitance varies in response to displacement of the proof mass to provide a displacement signal. The displacement signal is applied to one or more electromagnets, used to force the proof mass back to a null or at-rest position. The drive current applied to the electromagnets thus represents the force or acceleration applied to the accelerometer. The electromagnets include a magnet, rigidly secured to an excitation ring which forms a magnetic return path. In order no relieve stresses due to thermal expansion, the magnet is slightly elevated and the bonding area is constrained to a minimum. By relieving the stress at the magnet interface, the performance of the accelerometer in accordance with the present invention will be relatively stable over time.

BRIEF DESCRIPTION OF THE DRAWING

These and other objects of the present invention will be readily understood with reference to the following detailed description and attached drawing, wherein.

DETAILED DESCRIPTION OF THE PREFERRED EMBODIMENT

Figure 1:
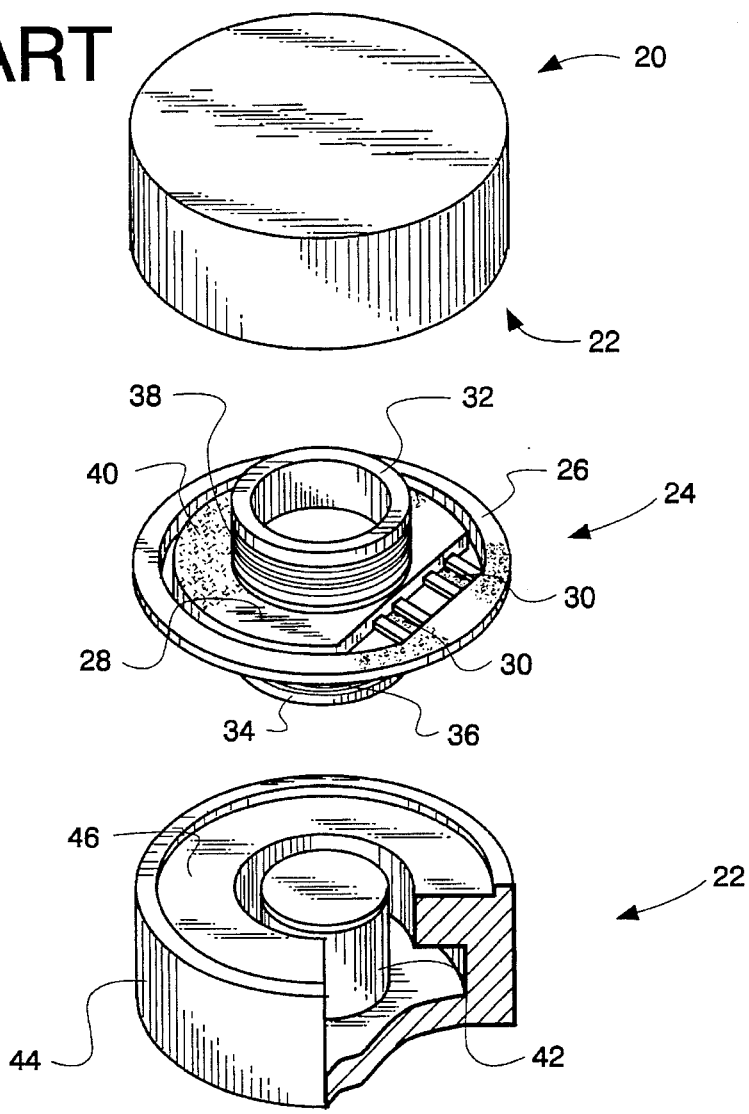
FIG. 1 is an exploded perspective view of a known force rebalance accelerometer.

FIG. 1 illustrates a known force rebalance accelerometer, generally identified with the reference numeral 20. The force rebalance accelerometer includes one or more magnet assemblies 22 and a proof mass assembly 24. The proof mass assembly 24 includes a mounting ring 26 and a generally paddle-shaped proof mass 28. The proof mass 28 is suspended relative to the mounting ring 26 by way of a pair of flexures 30 to enable the proof mass 28 to rotate relative to the mounting ring 26. Cylindrically shaped bobbins 32 and 34 are formed on opposing surfaces of the proof mass 28. The bobbins 32 are used to carry torquer coils 36 and 38. Conductive material 40 is deposited on the opposing surfaces of the proof mass 28 to form pick-off capacitance plates.

The magnet assemblies 22 include a permanent magnet 42 and a generally cylindrical excitation ring or flux concentrator 44. The excitation ring 44 is configured to have a generally C-shaped cross section. The material for the excitation ring 44 is selected to have relatively high permeability, such as Invar, to form a magnetic return path. Inwardly facing surfaces 46 on the excitation rings 44 form in combination with the conductive material 40 on the opposing sides of the proof mass 28 form variable capacitance elements PO1 and PO2 as shown in FIGS. 1 and 2.

Figure 2:
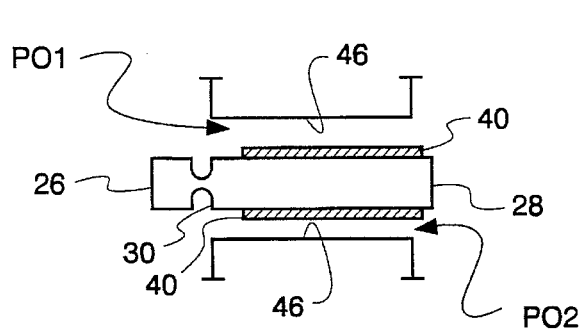
FIG. 2 is a simplified cross-sectional view of a known force rebalance accelerometer.

Referring to FIG. 2, the proof mass 28 is shown at an at-rest or null position. In this position, the distance between the surfaces 46 of the upper and lower excitations rings 44 and the pick-off capacitance plates 40 are equal. Since capacitance is a function of the distance between the plates, the capacitance values of the capacitors PO1 and PO2 are equal during this condition.

In response to an acceleration or force along a sensitive axis S, generally perpendicular to the plane of the proof mass 28, the proof mass 28 moves toward one or the other of the excitation rings 44. This displacement of the proof mass 28 changes the respective distances between the surfaces on the pick-off capacitance plates 46 formed on the opposing sides of the proof mass 28 relative to the upper and lower excitation rings 44. This change in the distance results in a change in the capacitance of the capacitive elements PO1 and PO2. Circuitry for measuring this change in capacitance is disclosed in U.S. Pat. No. 4,634,965 and co-pending application Ser. No. 08/151,417, filed on Nov. 12, 1993 by Paul W. Rashford and entitled "IMPROVEMENT OF CHARGE BALANCING CIRCUIT" and incorporated herein by reference.

The difference in the values of the capacitances PO1 and PO2 is representative of the displacement of the proof mass 28 either upwardly or downwardly along the sensitive axis S. This displacement signal is applied to a servo system which includes the magnet assemblies 22 and the torquer coils 36 which form electromagnets to return the proof mass 28 to its null position. The magnitude of the drive current to the electromagnets is a measure of the acceleration of the proof mass 28 along the sensitive axis S.

The magnet assembly 60 in accordance with the present invention, generally identified with the reference numeral 60 (FIG. 3), solves these problems. The magnet assembly 60 includes an excitation ring 61, a magnet 42 and a pole piece 62. The excitation ring 61 is formed in a generally cylindrical shape with a C cross section. The magnet 42 having opposing bonding surfaces 63 is centrally secured to a base portion 64 of the excitation ring 61. As mentioned above, known force rebalance accelerometers include a magnet assembly which includes an excitation ring bonded to the entire bonding surface of the magnet. Additionally, a pole piece may be bonded to an opposing surface of the magnet. Due to the difference in materials used for the magnet, the pole piece and the excitation ring, the differing rates of thermal expansion cause stress at the magnet to excitation ring interface and the magnet to pole piece interface. This stress produces distortion in the excitation ring and the pole piece which degrades performance. Since the magnet is normally bonded to the excitation ring with an epoxy, such stress also weakens the bonding over time and, as such, degrades the performance of the accelerometer.

Figure 3:
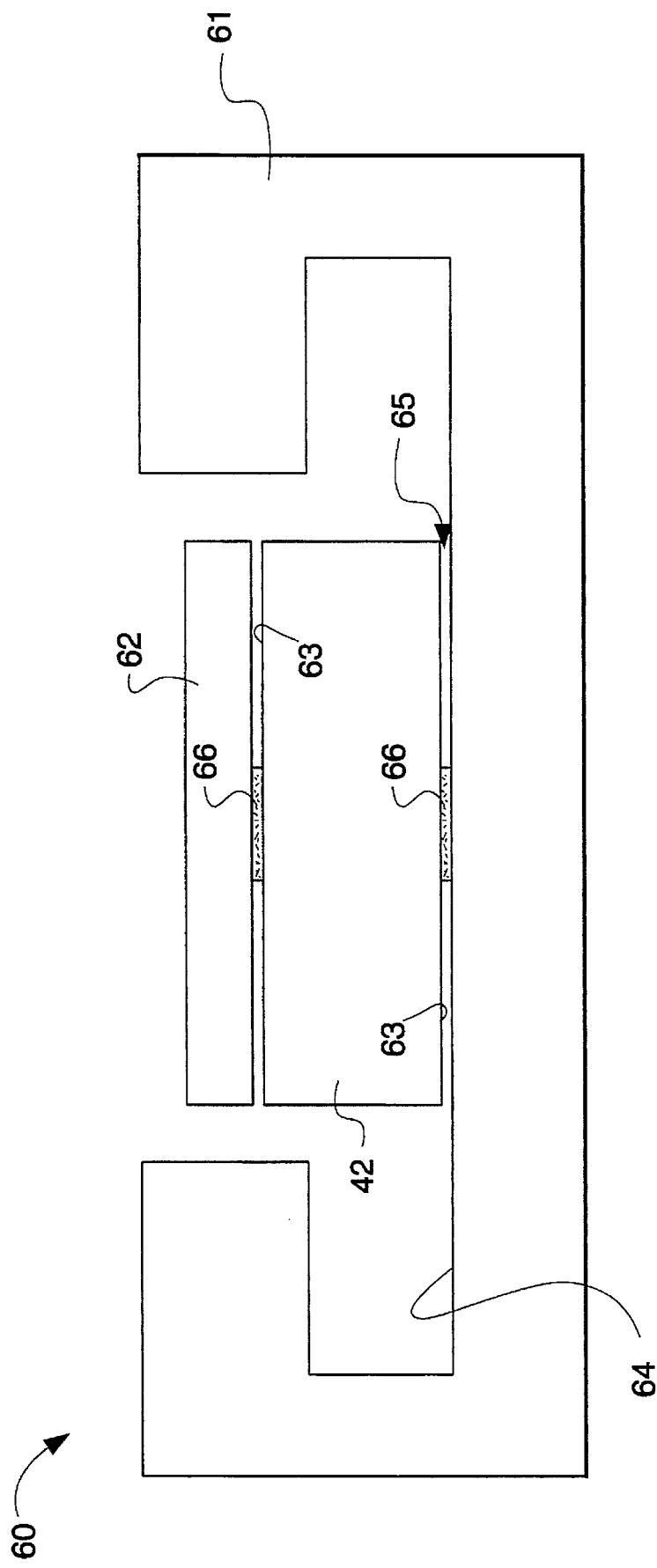
FIG. 3 is a partial cross-sectional view of a magnet assembly in accordance with the present invention.

The magnet assembly 60 in accordance with the present invention is formed such that the magnet 42 is spaced apart from the base portion 64 of the excitation ring 61 by a relatively small gap 65. In order to minimize the stress due to thermal expansion, the bonding material 66 is constrained to a minimum as shown in FIG. 3 forming a pedestal to cover a relatively small portion of the bottom surface area 63 of the magnet 42.

The pole piece 62 may be bonded to the other pole face or bonding surface 63 of the magnet 42 to form the magnet assembly 60. In order to reduce stress due to temperature at this interface, the pole piece 62 is bonded only to a small portion of the bonding surfaces 63 of the magnet 42.

Since the bonding material 66 is non-magnetic, the addition of the air gap 65 has little effect on the magnetic circuit. In addition, by minimizing the bonding area, the overall stress is significantly reduced, thus providing an accelerometer with a relatively stable output over time.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A force rebalance accelerometer, comprising:

a proof mass;

a mounting ring;

a pair of flexures for flexibility connecting the proof mass to the mounting ring;

means for returning the proof mass to a null position, said returning means including a permanent magnet having a first and a second opposing bonding surfaces and at least one excitation ring said first bonding surface of said magnet spaced adjacent to said excitation ring; and means for bonding said first bonding surface of said magnet to said excitation ring, said bonding means only bonding a predetermined portion of said first bonding surface of said magnet thereby forming a pedestal and wherein a gap exists between a remaining portion of said first bonding surface and said excitation ring.

2. A force rebalance accelerometer as recited in claim 1, further including a pole piece bonded to said second bonding surface of said magnet.

3. A force rebalance accelerometer as recited in claim 1, further including a generally circular pole piece and means for bonding said pole piece to one of said first or second bonding surfaces of said magnet, said bonding means only bonding a predetermined portion of said bonding surface of said magnet thereby forming a pedestal.

\* \* \* \* \*